(12) United States Patent
Reimer et al.

(10) Patent No.: US 12,047,452 B2
(45) Date of Patent: Jul. 23, 2024

(54) METHOD FOR RETRIEVING OPERATIONAL DATA FROM A WIND FARM

(71) Applicant: VESTAS WIND SYSTEMS A/S, Aarhus N (DK)

(72) Inventors: Anders Reimer, Hadsten (DK); Tommy Frichot, Beder (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 18/248,588

(22) PCT Filed: Oct. 18, 2021

(86) PCT No.: PCT/DK2021/050309
§ 371 (c)(1),
(2) Date: Apr. 11, 2023

(87) PCT Pub. No.: WO2022/083836
PCT Pub. Date: Apr. 28, 2022

(65) Prior Publication Data
US 2023/0379384 A1   Nov. 23, 2023

(30) Foreign Application Priority Data
Oct. 22, 2020   (DK) ............ PA 2020 70698

(51) Int. Cl.
*H04L 67/12*       (2022.01)
*F03D 9/25*        (2016.01)
(Continued)

(52) U.S. Cl.
CPC ............ *H04L 67/12* (2013.01); *F03D 17/007* (2023.08); *H04L 67/561* (2022.05); *F03D 9/257* (2017.02)

(58) Field of Classification Search
CPC ..... H04L 67/12; H04L 67/561; F03D 17/007; F03D 9/257
See application file for complete search history.

(56) References Cited

U.S. PATENT DOCUMENTS

| | | |
|---|---|---|
| 2005/0090937 A1 | 4/2005 | Moore et al. |
| 2009/0210200 A1 | 8/2009 | Kunft et al. |

(Continued)

FOREIGN PATENT DOCUMENTS

| | | |
|---|---|---|
| DE | 102018007996 A1 | 4/2020 |
| EP | 2652323 B1 | 7/2015 |
| WO | 2022083836 A1 | 4/2022 |

OTHER PUBLICATIONS

Danish Patent and Trademark Office, 1st Technical Examination including The Search Report and Search Opinion for Application PA 2020 70698 dated May 22, 2021.

(Continued)

*Primary Examiner* — Azizul Choudhury
(74) *Attorney, Agent, or Firm* — Patterson + Sheridan, LLP

(57) ABSTRACT

A method for retrieving operational data from a wind farm via one or more data hubs is disclosed. Operational data is collected from at least one of the wind turbines of the wind farm at a first data hub at the wind farm. The first data hub initiates transfer of the collected operational data towards a data recipient arranged outside the wind farm, and the operational data is received at the data recipient. The first data hub adds transfer information to the operational data, prior to transferring the operational data towards the data recipient. The added transfer information is transferred along with the operational data, the data recipient thereby receiving the transfer information along with the operational (Continued)

data, thereby enabling the data recipient to back trace a transfer history of the received operational data.

17 Claims, 3 Drawing Sheets

(51) Int. Cl.
  *F03D 17/00* (2016.01)
  *H04L 67/561* (2022.01)

(56) References Cited

U.S. PATENT DOCUMENTS

| | | | |
|---|---|---|---|
| 2014/0375052 A1* | 12/2014 | Nielsen | F03D 9/255 |
| | | | 290/44 |
| 2015/0308416 A1* | 10/2015 | Ambekar | F03D 7/045 |
| | | | 700/287 |
| 2017/0310483 A1 | 10/2017 | Nagao et al. | |
| 2018/0268581 A1* | 9/2018 | Demuth | F03D 7/048 |
| 2018/0316762 A1 | 11/2018 | Matsumoto et al. | |
| 2021/0062786 A1* | 3/2021 | Lovmand | F03D 9/257 |

OTHER PUBLICATIONS

PCT, Notification of Transmittal of The International Search Report and The Written Opinion of The International Searching Authority, or The Declaration for Application PCT/DK2021/050309 dated Jan. 26, 2022.

* cited by examiner

METHOD FOR RETRIEVING OPERATIONAL DATA FROM A WIND FARM

FIELD OF THE INVENTION

The present invention relates to a method for retrieving operational data from a wind farm via one or more data hubs. The method according to the invention allows the transfer of operational data from the wind farm to a data recipient outside the wind farm, via the one or more data hubs, to be traced, without requiring that the data recipient contacts or accesses the wind farm or the data hubs.

BACKGROUND OF THE INVENTION

During operation of a wind farm, data regarding the operation of the wind turbines of the wind farm is collected. It is sometimes necessary for parties arranged outside the wind farm to gain access to such operational data. Such parties could, e.g., be a manager and/or owner of several wind farms, a wind turbine manufacturer wishing to collect performance data from a vast number of wind turbines, etc.

In order to retrieve operational data from a wind farm to a location outside the wind farm as described above, a data recipient may contact a data collector or a data hub within the wind farm, in order to request access to the data and initiate the data transfer. This requires an inbound communication channel in the wind farm, and since this may potentially introduce a risk for security breaches, it is increasingly common that wind farms do not allow that data collectors or data hubs within the wind farm are contacted in this manner, or that such inbound communication channels are established. Instead, data transfer may be initiated from within the wind farm.

Sometimes data packages may be delayed, lost or corrupted during a data transfer. When this happens, it may be relevant for the recipient of the data to investigate how and where irregularities occurred. However, in set-ups where the data recipient is not allowed to communicate to data collectors or data hubs within the wind farm, it is difficult to obtain information regarding the data transfer.

US 2017/0310483 A1 discloses a method that facilitates secure collection and management of operational data relating to a power generation system that includes one or more wind turbines. The method may facilitate policy-managed access to operational data, including policy-managed access implementing differential privacy. A trusted service may receive operational data from wind turbines and additional data from a data service provider. User systems may request operational data managed by the trusted service subject to articulated policies enforced by the trusted service.

DESCRIPTION OF THE INVENTION

It is an object of embodiments of the invention to provide a method for retrieving operational data from a wind farm, in which inbound communication to the wind farm is avoided, while allowing a data recipient to trace the data transfer.

The present invention provides a method for retrieving operational data from a wind farm via one or more data hubs, the wind farm comprising two or more wind turbines, the method comprising the steps of:

collecting operational data from at least one of the wind turbines of the wind farm at a first data hub at the wind farm, the first data hub initiating transfer of the collected operational data towards a data recipient arranged outside the wind farm, and receiving the operational data at the data recipient, wherein the first data hub adds transfer information to the operational data, prior to transferring the operational data towards the data recipient, the added transfer information being transferred along with the operational data, the data recipient thereby receiving the transfer information along with the operational data, thereby enabling the data recipient to back trace a transfer history of the received operational data.

Thus, the invention provides a method for retrieving operational data from a wind farm via one or more data hubs. In the present context the term 'wind farm' should be interpreted to mean a plurality of wind turbines arranged within a specified geographical area, and which share some infrastructure, such as internal power grid, connection to an external power grid, substations, access roads, etc.

In the present context the term 'operational data' should be interpreted to mean data regarding the operation of the wind turbines, collected while the wind turbines operate. The operational data could, e.g., include power production of the wind turbines, various sensor measurements, e.g. from load sensors, temperature sensors, vibration sensors, wind data, such as wind speed, wind direction, turbulence conditions, gust conditions, etc., at various positions in the wind farm, and/or any other suitable kind of data which provides information regarding the operation of the wind turbines.

In the present context the term 'data hub' should be interpreted to mean a node at a data transfer path which the operational data passes when being transferred from the wind farm to a data recipient. The data hubs could, e.g., be in the form of the wind turbines themselves, data collectors within the wind farm, data substations or relay stations collecting data from multiple wind farms, data analysis centres, etc. Accordingly, at least some of the data hubs receive the operational data from a previous data hub and forwards the operational data to a subsequent data hub, as part of the transfer of the operational data from the wind farm to the final data recipient.

In the method according to the invention, operational data is initially collected from at least one of the wind turbines of the wind farm at a first data hub at the wind farm. The first data hub may simply be one of the wind turbines collecting data from itself and possibly from one or more neighbouring wind turbines. As an alternative, the first data hub may be a communication substation positioned within the wind farm, e.g. in the form of a SCADA server, collecting data from at least some of the wind turbines. In any event, the first data hub is positioned within the wind farm, and thereby within a, communication-wise, closed or secure environment of the wind farm. Thus, the first data hub may communicate with the wind turbines, and possibly other units of the wind farm, via a closed communication network of the wind farm.

Next, the first data hub initiates transfer of the collected operational data towards a data recipient arranged outside the wind farm. Thus, the collected operational data is transferred out of the safe environment of the wind farm, towards a data recipient which needs access to the operational data. Accordingly, the data transfer can not take place via the closed communication network of the wind farm. The data transfer is initiated by the first data hub, i.e. from within the wind farm, and without the data recipient requesting the operational data or in other ways contacting the first data hub or other units within the wind farm. Accordingly, inbound communication to the wind farm is not required in order to initiate the data transfer.

Finally, the operational data is received at the data recipient, possibly via one or more further data hubs. The data recipient may, e.g., be a data centre in which data from several wind farms is accumulated and analysed, e.g. in order to generate statistical data regarding operation, performance, etc., of the wind turbines. Such data centres could, e.g., be operated by a manager or an owner of the wind farm, or by a wind turbine manufacturer.

Prior to transferring the operational data towards the data recipient, the first data hub adds transfer information to the operational data. The added transfer information is transferred along with the operational data towards the data recipient. Accordingly, the data recipient receives the operational data as well as the transfer information added by the first data hub. In the present context the term 'transfer information' should be interpreted to mean information related to the transfer handling taking place at the first data hub, including receipt and forwarding of the operational data at the first data hub, e.g. in the form of time of receipt of the operational data, time of (re)transfer of the operational data, latency time, number of attempts of (re)transfer, etc. Accordingly, the transfer data forms direct information regarding how the transfer of the operational data was handled or performed at the data hub which added the transfer data, and it therefore provides valuable information regarding the part of the transfer path or transfer chain which includes that data hub. This will be described in further detail below.

Accordingly, the data recipient is immediately in the possession of information regarding the data transfer when the operational data is received, in the form of the transfer data received along with the operational data. This enables the data recipient to back trace a transfer history of the received operational data. In particular, the data recipient will be able to investigate the cause and origin, along the transfer chain, of any delays, data package loss, etc., of the operational data, without requiring that the data recipient contacts any units within the wind farm or any data hubs along the transfer chain. This is due to the fact that the transfer information received by the data recipient contains information, for each data hub along the transfer path which added transfer information, which relates to the transfer handling at the corresponding parts of the transfer path or transfer chain. Furthermore, this information is made readily available to the data recipient because the transfer information is always added by the data hub, without the data recipient needing to request this, and because the data transfer is initiated by the first data hub.

The operational data may be transferred from the first data hub to the data recipient via at least one intermediate data hub, and at least one of the intermediate data hub(s) may add further transfer information to the operational data.

According to this embodiment, the first data hub does not transfer the operational data directly to the data recipient. Instead the first data hub transfers the operational data, and the transfer information added by the first data hub, to an intermediate data hub. The intermediate data hub then adds further transfer information to the operational data, the further transfer information reflecting transfer handling of the operational data at the intermediate data hub, similarly to the transfer information added by the first data hub. The intermediate data hub then transfers the operational data, along with the transfer information added by the first data hub and the transfer information added by the intermediate data hub, to the data recipient or to a further intermediate data hub. In the case that the intermediate data hub transfers the data to a further intermediate data hub, then the process described above is repeated in the sense that this further intermediate data hub also adds transfer information and transfers the data to the next node in the transfer chain, until the operational data and all added transfer information reaches the data recipient.

Thus, when the operational data reaches the data recipient, the data recipient also receives a complete transfer history of the transfer of the operational data from the first data hub, via each intermediate data hub, to the data recipient, including information regarding transfer handling at each step on the way, in the form of each intermediate data hub. This allows the data recipient to readily derive where in the transfer process a possible delay, data package loss, etc., occurred, based on the received information.

One or more of the intermediate data hubs may be arranged within the wind farm and/or one or more of the intermediate data hubs may be arranged outside the wind farm.

The first data hub may transfer the operational data to an intermediate data hub via a dedicated communication connection, and the data recipient may receive the operational data from an intermediate data hub via a global communication network.

According to this embodiment, part of the data transfer from the first data hub to the data recipient takes place via dedicated communication connections, and part of the data transfer takes place via a global communication network, such as the Internet.

A dedicated communication connection has the advantage that the security level is high, in the sense that it is extremely difficult, if not impossible, to gain unauthorized access to data transferred via such a connection. However, it is a disadvantage that data can only be transferred to data hubs which are connected to the dedicated communication connection, and thereby it is difficult for an external party, such as a wind turbine manufacturer, to gain access to the data. The dedicated communication connection may, e.g., form part of an internal, possibly wired, communication network within the wind farm. Such an internal communication network may allow the wind turbines to communicate with each other, data collectors, a power plant controller, etc., while preventing external access to the wind turbines, and possibly other units within the wind farm.

On the other hand, communication via a global communication network, such as the Internet, allows the data to be transferred to any unit with access to the global communication network, possibly subject to an authorisation process, and thereby the operational data can easily be directed towards any desired data recipient, and an external, but authorized, party may thereby easily gain access to the operational data. However, a global communication network introduces a risk of unauthorized access to the data or to the data hubs.

By performing part of the data transfer via a dedicated communication connection and part of the data transfer via a global communication network, a high security level is obtained while allowing easy access to the operational data for legitimate external parties. For instance, operational data collected from several wind turbines within the wind farm may be transferred, via dedicated communication connections in the form of an internal wired communication network of the wind farm, to a single data hub within the wind farm, and the single data hub may then transfer the operational data to an intermediate data hub outside the wind farm, or to the data recipient, via the global communication network. The single data hub may be the only unit in the wind farm which is connected to the global communication network. This minimises the vulnerability of the wind farm with respect to cyber attacks.

The transfer information may include information regarding handling of the operational data at the data hub which adds the transfer information.

Such information may, e.g., include information regarding time of receipt of the operational data at the data hub, i.e. the point in time where the operational data reaches the data hub. If the time of receipt is registered for each data hub in the data transfer chain, it is possible to derive where in the data transfer chain a possible delay or a possible loss of data packages occurred.

Alternatively or additionally, the transfer information may include information regarding time of retransfer of the operational data from the data hub, i.e. the point in time where the data hub retransfers the operational data to the next data hub in the data transfer chain. Similarly to the time of receipt, information regarding the time of retransfer may be used for deriving where in the data transfer chain a possible delay or a possible loss of data packages occurred. If the time of the receipt as well as the time of retransfer is registered, a clear picture of the transfer history of a data package can easily be derived.

Alternatively or additionally, the transfer information may include information regarding the number of attempts of retransfer of the operational data from the data hub, i.e. the number of times the data hub has attempted to transfer the operational data to the next data hub in the transfer chain before a successful transfer to the next data hub is obtained. Unsuccessful retransfer attempts introduce delays in the data transfer process. Accordingly, if a high number of attempts of retransfer are required at a given data hub before successful transfer is obtained, this is an indication that this data hub is causing delays, and actions may therefore be taken in order to reveal the cause of the high number of required attempts of retransfer, and possibly remove this cause.

Alternatively or additionally, the transfer information may include information regarding latency at the data hub, e.g. in the form of time elapsing from receiving the operational data at the data hub until successful transfer of the operational data to the next data hub. This is also useful information with regard to retrieving the transfer history of the operational data, in particular with regard to identifying data hubs in the data transfer chain which cause delays.

In any event, information regarding handling of the operational data at the data hub which adds the transfer information provides valuable input for back tracing the transfer history of the operational data.

The transfer information may be added to the operational data in the form of metadata. According to this embodiment, the actual operational data is not affected when the data hub adds the transfer information to the operational data. Instead, the transfer information is included in the form of metadata, and the transfer information can thereby easily be retrieved from the data package once it has been received at the data recipient.

As an alternative, the transfer information may be added in a header of the operational data. In this case, the transfer information is also separated from the operational data in the sense that adding the transfer information does not affect the operational data, and the transfer information can easily be derived at the data recipient.

As another alternative, the transfer information may be added directly to the operational data.

The transfer information may comprise a digital signature generated by the data hub which adds the transfer information. The digital signature may, e.g., be generated based on the operational data.

According to this embodiment, the data hub which adds the transfer information certifies the operational data by adding the digital signature to the transfer information. This allows the data recipient to verify correctness of the received operational data, and it is ensured that the operational data has not been tampered with.

The method may further comprise the step of the data recipient reconstructing a transfer history of the received operational data, based on the received transfer information. This is particularly relevant in the case that two or more data hubs have added transfer information to the operational data during the transfer from the first data hub to the data recipient. By piecing together transfer information added by each data hub, a complete picture of the entire data transfer can be derived, thereby allowing the transfer history to be reconstructed at the data recipient.

BRIEF DESCRIPTION OF THE DRAWINGS

The invention will now be described in further detail with reference to the accompanying drawings in which.

DETAILED DESCRIPTION OF THE DRAWINGS

Figure 1:
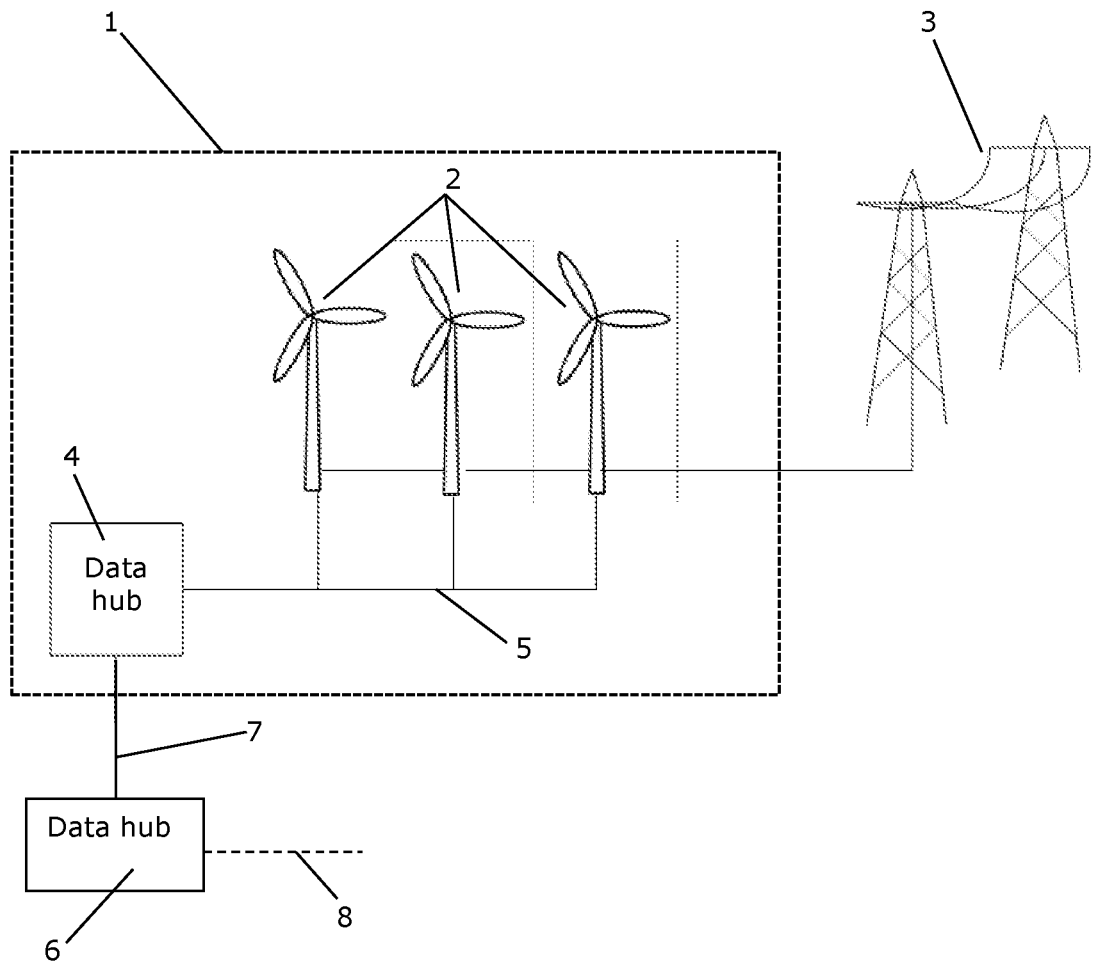
FIG. 1 illustrates a wind farm generating operational data being retrieved in accordance with a method according to an embodiment of the invention.

FIG. 1 illustrates a wind farm 1 comprising a plurality of wind turbines 2, three of which are shown. The wind turbines 2 produce power by extracting energy from the wind, and the produced power is supplied to a power grid 3. During operation, the wind turbines also generate operational data related to the operation of the wind turbines 2. The operational data could, e.g., include power production, various sensor measurements, meteorological data, etc. Sensor measurements could, e.g., include measurements from temperature sensors arranged at various positions within the wind turbine 2, measurements from load sensors, e.g. in the form of strain gauges or the like measuring deflections on wind turbine blades, tower, etc., measurements from vibration sensors, e.g. in the form of accelerometers or gyroscopes arranged at relevant positions of the wind turbine 2. The meteorological data could, e.g., include wind direction, wind speed, gust conditions, turbulence conditions, ambient temperature, precipitation level and kind, humidity, air density, etc.

The operational data from the wind turbines 2 is collected by a first data hub 4 positioned within the wind farm 1. The operational data is transferred from the respective wind turbines 2 to the first data hub 4 via a communication connection 5. Since the first data hub 4 and the wind turbines 2 are all arranged within the wind farm 1, the communication connection 5 may form part of a closed communication network which allows units within the wind farm 1 to communicate with each other, but which does not allow communication with units arranged outside the wind farm 1. For instance, the communication connection 5 may be a dedicated connection and/or a wired connection. The first data hub 4 may further receive operational data from other sources than the wind turbines 2, for instance from metmast and/or from other data hubs which collect operational data from wind turbines arranged in other parts of the wind farm 1.

The first data hub 4 is configured to add transfer information to the operational data received from the wind turbines 2, and to transfer the operational data and the added transfer information to a first intermediate data hub 6 arranged outside the wind farm 1, via a communication connection 7. The added transfer information relates to the handling of the transfer of the operational data at the first data hub 4. The transfer information may, e.g., include information regarding time of receipt of the operational data at the first data hub 4, time of retransfer of the operational data from the first data hub 4 to the first intermediate data hub 6, number of attempts to retransfer the operational data before successful retransfer is obtained, latency in the transfer process, etc.

Thus, the first data hub 4 initiates transfer of the operational data, along with the added transfer information, out of the wind farm 1. The communication connection 7 may form part of a global communication network, such as the Internet.

The first intermediate data hub 6 also adds transfer information related to the handling of the transfer of the operational data at the first intermediate data hub 6. Furthermore, the first intermediate data hub 6 retransfers the operational data, with the transfer information added by the first data hub 4 as well as the transfer information added by the first intermediate data hub 6, towards a data recipient (not shown), possibly via one or more further intermediate data hubs (not shown). The transfer towards the data recipient takes place via a communication connection 8.

When the operational data eventually reaches the data recipient, the data recipient also receives the transfer information added by the data hubs 4, 6 forming the data transfer chain between the wind farm 1 and the data recipient. Thereby the data recipient is readily in the possession of information relating to the transfer handling taking place at each of the data hubs along the data chain, and which therefore enables the data recipient to reconstruct and back trace the transfer history of the operational data.

Figure 2:
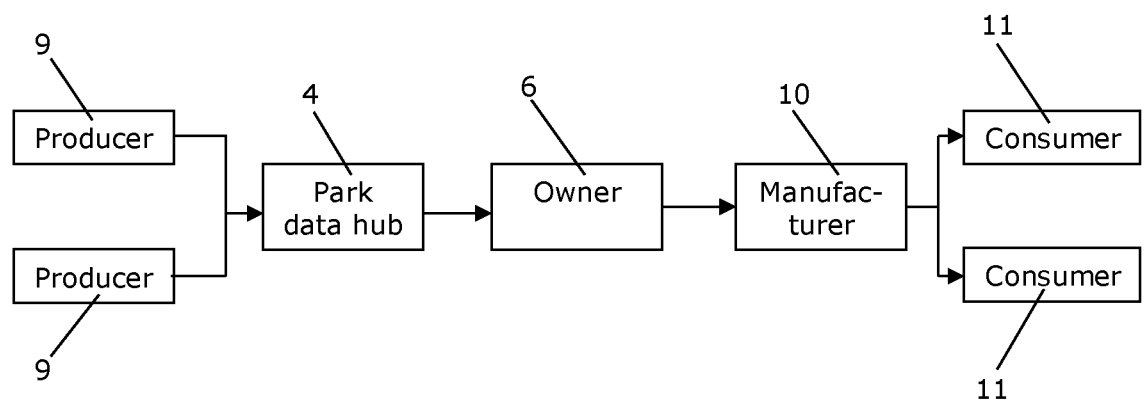
FIG. 2 illustrates data retrieval from a wind farm in accordance with a method according to an embodiment of the invention.

FIG. 2 illustrates data retrieval from a wind farm in accordance with a method according to an embodiment of the invention. The wind farm could, e.g., be the wind farm illustrated in FIG. 1.

Operational data is generated by a number of data producers 9, e.g. in the form of wind turbines, metmast, data substations, etc., e.g. in the manner described above with reference to FIG. 1. The data producers 9 are all positioned within the wind farm.

The operational data generated by the data producers 9 is collected by a first data hub 4, which is also arranged within the wind farm. The first data hub 4 adds transfer information to the collected operational data before transferring the operational data to a first intermediate data hub 6, in the form of a data centre operated by the owner of the wind farm. The first intermediate data hub 6 may be arranged outside the wind farm, and the data transfer from the first data hub 4 to the first intermediate data hub 6 may thereby constitute transfer of operational data out of the wind farm.

The added transfer information relates to handling of transfer of the operational data at the first data hub 4, and may include information regarding time of receipt of the operational data, time of retransfer of the operational data, number of attempts of retransfer, latency information, etc.

The first intermediate data hub 6 also adds transfer information to the operational data before transferring the operational data, along with the transfer information added by the first data hub 4 as well as by the first intermediate data hub 6, to a second intermediate data hub 10, in the form of a data centre operated by a manufacturer of the wind turbines at the wind farm.

The second intermediate data hub 10 also adds transfer information to the operational data, and transfers the operational data, along with all the added transfer information, to a number of data recipients 11 constituting the final destination for the operational data.

Thus, the data recipients 11 receive the operational data, but also information related to the transfer of the operational data from the first data hub 4 to the data recipients 11, via the intermediate data hubs 4, 10. Accordingly, the transfer information enables the data recipients 11 to reconstruct the transfer history of the operational data, including identifying where and how possible delays or risk of loss of data packages occur. Furthermore, the required information enabling this is readily available to the data recipients 11 upon receipt of the operational data, and it is therefore not necessary for the data recipients 11 to contact units within the wind farm, including the data producers 9 and the first data hub 4, in order to be able to reconstruct and back trace the transfer history.

Figure 3:
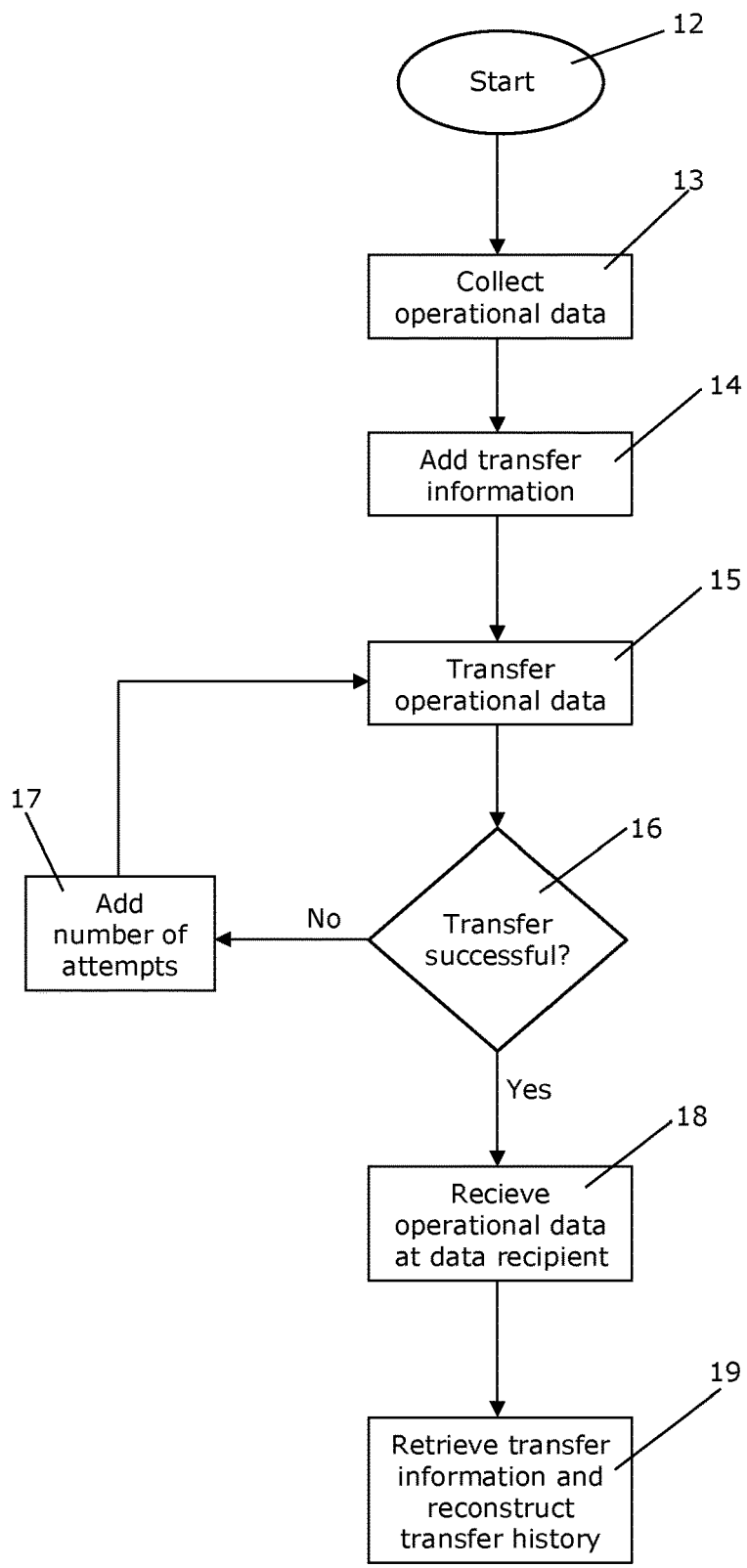
FIG. 3 is a flow chart illustrating a method according to an embodiment of the invention.

FIG. 3 is a flow chart illustrating a method according to an embodiment of the invention. The process is started at step 12. At step 13 operational data related to operation of a plurality of wind turbines within a wind farm is collected at a first data hub, e.g. in the manner described above with reference to FIGS. 1 and 2. The first data hub is arranged within the wind farm.

At step 14 the first data hub adds transfer information to the operational data. The added transfer information relates to handling of data transfer taking place at the first data hub, and it may be added in the manner described above with reference to FIGS. 1 and 2.

At step 15 the first data hub initiates transfer of the operational data towards a data recipient arranged outside the wind farm by attempting to transfer the operational data and the added transfer information towards the data recipient. Accordingly, the data transfer is initiated by the first data hub and without the data recipient requesting the data or in other ways contacting the data hub or other units arranged within the wind farm.

At step 16 it is investigated whether or not the transfer of the operational data was successful. If this is not the case, i.e. if the transfer failed, the process is forwarded to step 17, where the number of unsuccessful attempts to transfer the operational data is added to the transfer information before the process is returned to step 15 and transfer is attempted again.

In the case that step 16 reveals that the transfer was successful, the process is forwarded to step 18, where the operational data and the added transfer information is received at the data recipient. Thus, the data recipient is in the possession of the collected operational data, as well as of the added transfer information.

Accordingly, at step 19 the data recipient retrieves the transfer information from the received data and reconstructs the transfer history of the operational data based on the retrieved transfer information.

At step 15 the operational data and the transfer information may be transferred directly to the data recipient. As an alternative, the data may be transferred from the first data hub to the data recipient via one or more intermediate data hubs. In this case steps 15-17 are repeated at each intermediate data hub, i.e. each intermediate data hub adds transfer information relating to transfer handling at that intermediate data hub and transfers the operational data, along with all added transfer information, to the next intermediate data hub, or to the data recipient.

The invention claimed is:

1. A method for retrieving operational data from a wind farm via one or more data hubs, the wind farm comprising two or more wind turbines, the method comprising:
   collecting operational data from at least one of the wind turbines of the wind farm at a first data hub at the wind farm,
   the first data hub initiating transfer of the collected operational data towards a data recipient arranged outside the wind farm, and
   wherein the first data hub adds transfer information to the operational data, prior to transferring the operational data towards the data recipient, the added transfer information being transferred along with the operational data, and
   wherein the transfer information includes a number of times the first data hub has attempted to transfer operational data before a successful transfer is obtained, and
   wherein the transfer information comprises a digital signature generated by the data hub which adds the transfer information.

2. The method according to claim 1, wherein the operational data is transferred from the first data hub to the data recipient via at least one intermediate data hub, and wherein at least one of the intermediate data hub(s) adds further transfer information to the operational data.

3. The method according to claim 2, wherein the first data hub transfers the operational data to an intermediate data hub via a dedicated communication connection, and the data recipient receives the operational data from an intermediate data hub via a global communication network.

4. The method according to claim 2, wherein the at least one of the intermediate data hub(s) that adds the further transfer information to the operational data is arranged outside of the wind farm.

5. The method according to claim 1, wherein the transfer information includes information regarding handling of the operational data at the data hub which adds the transfer information.

6. The method according to claim 1, wherein the transfer information is added to the operational data in a form of metadata.

7. The method according to claim 1, wherein the operational data is transferred from the first data hub to the data recipient via at least a first intermediate data hub and a second intermediate data hub, wherein the first intermediate data hub is operated by an owner of the wind farm and the second intermediate data hub is operated by a manufacturer of the wind turbines at the wind farm, and wherein both the first and second intermediate data hubs add further transfer information to the operational data.

8. The method according to claim 1, wherein the transfer information is added in a header of the operational data.

9. The method according to claim 1, wherein the transfer information is added directly to the operational data.

10. The method according to claim 1, wherein the operational data is transferred from the first data hub towards the data recipient via at least one intermediate data hub, and wherein the transfer information includes latency information that specifies an elapsed time from a given data hub receiving the operational data at the given data hub until the given data hub successfully transfers the operational data, and wherein the given data hub is the first data hub or one of the at least one intermediate data hub.

11. The method according to claim 1, further comprising:
   receiving the operational data along with the transfer information at the data recipient, thereby enabling the data recipient to back trace a transfer history of the received operational data.

12. The method according to claim 11, further comprising the step of the data recipient reconstructing a transfer history of the received operational data, based on the received transfer information.

13. A system, comprising:
   a communication network communicatively coupled with one or more wind turbines of a wind farm; and
   a data hub communicatively coupled with the communication network, the data hub is operable to:
      receive operational data associated with at least one wind turbine of the one or more wind turbines of the wind farm;
      add transfer information to the operational data, the transfer information includes a number of times the data hub has attempted to transfer the operational data before a successful transfer to a subsequent node communicatively coupled with the communication network is obtained, and wherein the transfer information comprises a digital signature generated by the data hub which adds the transfer information; and
      transfer the operational data along with the transfer information to the subsequent node.

14. The system of claim 13, wherein the data hub is arranged within the wind farm.

15. The system of claim 13, wherein the data hub is arranged outside of the wind farm.

16. A computing system serving as a data hub arranged along a data transfer path of a communication network, the computing system comprising a processor and a memory device storing a program, which, when executed by the processor, causes the processor to perform an operation, the operation comprising:
   receiving operational data associated with at least one wind turbine of a wind farm;
   adding transfer information to the operational data, the transfer information includes a number of times the data hub has attempted to transfer the operational data before a successful transfer to a subsequent node of the communication network is obtained, and wherein the transfer information comprises a digital signature generated by the data hub which adds the transfer information; and
   transferring the operational data along with the transfer information to the subsequent node.

17. A method for retrieving operational data from a wind farm via one or more data hubs, the wind farm comprising two or more wind turbines, the method comprising:
   collecting operational data from at least one of the wind turbines of the wind farm at a first data hub at the wind farm,
   the first data hub initiating transfer of the collected operational data towards a data recipient arranged outside the wind farm, and
   wherein the first data hub adds transfer information to the operational data, prior to transferring the operational data towards the data recipient, the added transfer information being transferred along with the operational data, and wherein the transfer information includes a number of times the first data hub has attempted to transfer operational data before a successful transfer is obtained, and wherein the operational data is transferred from the first data hub to the data recipient via intermediate data hubs, and wherein at least one of the intermediate data hubs adds further transfer information to the operational data, and wherein the first data hub transfers the operational data to one of the intermediate data hubs via a dedicated communication connection, and the data recipient receives the operational data from one of the intermediate data hubs via a global communication network.

\* \* \* \* \*